Patented Apr. 26, 1932

1,855,934

UNITED STATES PATENT OFFICE

HARRY P. BANKS, GLENN DAVIDSON, IRVING F. LAUCKS, AND HUGH F. RIPPEY, OF SEATTLE, WASHINGTON, ASSIGNORS TO I. F. LAUCKS INC., OF SEATTLE, WASHINGTON, A CORPORATION OF WASHINGTON

EMULSIFYING AGENT

No Drawing. Application filed February 16, 1927. Serial No. 168,843.

Our invention relates to the art of emulsions. More particularly our invention relates to emulsifying agents, and of those agents, to such as embody or comprise the flour obtained by finely grinding the residue remaining after the commercial extraction of the oil from an oleaginous seed, and to those emulsions which include water as an ingredient.

A most important quality of an emulsion is its permanence. Serious objection obtains to many emulsions as heretofore prepared due to their respective ingredients separating out into separate masses or liquids. We are aware that many materials have been proposed as emulsifying agents. Many of these must be manipulated with great care or satisfactory and permanent emulsions will not result. To be entirely satisfactory an emulsifying agent must have emulsifying power in large degree, so that the results are largely independent of the mechanical manipulation employed.

A primary object of our invention is to provide an emulsifying agent which will impart to the emulsion the characteristic of remaining as an emulsion, i. e., to provide an emulsifying agent having the emulsifying power in a very large degree so that excellent results are obtained and this largely independent of the mechanical manipulation employed.

Furthermore, serious objection obtains to emulsifying agents as heretofore known in that the temperature during the preparation period of the emulsion must be very closely controlled to provide satisfactory results. A primary object of our invention is to provide an emulsifying agent which will give entirely satisfactory results even though the temperature may vary over a relatively wide range.

Furthermore, objection obtains to the present known emulsifying agents in that in some emulsions it is highly important to be able to use a very small amount of the emulsifying agent, and this is not possible with said agents heretofore known.

A primary object of our invention is to provide an agent which will be characterized by the feature that excellent results may be obtained by using a very small quantity of the emulsifying agent.

If it is attempted to mix pure oil and pure water by mechanical means, as by shaking, one or the other liquid will break up into drops, but soon after the shaking stops these drops coalesce and two layers again result. If some appropriate third substance is added, however, the drops become so small as to be invisible, and an apparently homogeneous mass results, which is an emulsion. If properly made, the emulsion is relatively permanent, i. e., remains homogeneous for a relatively long time. This third substance is called herein "an emulsifying agent." Also this third substance need not be a simple substance.

For the purposes of this application we will define an emulsifying agent as a substance used to make more permanent a mixture of two liquids which are practically insoluble, the one in the other; or a mixture of a liquid or liquids and a solid or solids which are insoluble in the liquid. By making permanent, we mean to prevent or hinder the separation of the ingredients into relatively large bodies, as, for example, the separation of oil and water emulsion into layers of oil and water. The mixture of a liquid and a solid insoluble therein is usually called "a suspension", and a substance which renders a suspension more permanent may be called "a suspending agent." Our reason for using the term "emulsifying agent" to include both solids and liquids, is that it is very difficult to differentiate between the two cases. For example, we describe later on asphalt or melted paraffin wax emulsions. As long as the temperature remains above the melting point, these are true emulsions but on standing they cool and the asphalt and paraffin become solid. We then have a mixture of the liquid water and the solid asphalt or paraffin. For this reason we prefer to define for purposes of this application an emulsifying agent as including also a suspending agent.

Also, herein we use the term "emulsion" to include both ideas:—where the oil is the dispersed phase and the water is the continuous phase as well as where the water is the dispersed phase and the oil is the continuous phase.

We have discovered that a number of flours obtained by finely grinding the residue remaining after the commercial extraction of the oil from an oleaginous seed are satisfactory emulsifying agents. The extraction may be either with a solvent, or by the expression of the oil by pressure, or any other means employed to separate the oil from the seed.

These flours seem to be characterized by containing vegetable proteins, and we have found them to be very satisfactory emulsifying agents for many purposes when properly employed.

Our experiments have included the flours obtained from such seeds as soya beans, peanuts, cottonseed and linseed, all of which contain proteins in large amounts. The residues of these seeds after the removal of the oil are dried and ground to flour. We find that soya bean flour is a very convenient material to use, and also is preeminent in its emulsifying properties.

In general, the higher the molecular weight of the liquid the easier it is to emulsify in water. A difficult test of an emulsifying agent is its ability to emulsify the lighter mineral oils, e. g. kerosene, gasoline, benzene, etc. In the examples given it will be noted that soya bean flour is able to emulsify these light oils.

The procedure in general, in using vegetable protein containing flours as emulsifying agents, is to first disperse the flour in water. This may be done by the stirring of the flour into the water, or by the aid of dispersing agents such as caustic soda, alkaline salts, acids, etc., in fact, any chemical that will increase or decrease the hydrogen ion concentration of the water and flour mixture from the so-called isoelectric point will increase the dispersion. Our experiments show that soya bean flour is not soluble in water, in the sense that the term "soluble" is used by chemists. Rather, it exists in the form of a colloidal dispersion. By "dispersion" we mean the state attained in the transformation of a mealy-like or granular mass to a more or less smooth mass in the presence of a liquid and to such extent as we thus refer to the degree of subdivision of particles we believe that we are using the term "dispersion" not inconsistently with the usage accepted by colloid chemists. The chemicals used in doing this will be evident from the examples given after the dispersion of the vegetable protein flour in water has been effected, the material which it is desired to emulsify is then added, with stirring. After all has been added, stirring may be continued for a few minutes, whereupon the emulsion is complete and ready for use. In the following examples, unless otherwise specified, it will be understood that this is the procedure followed:

(1) (A) 2.5 parts soya bean flour are mixed by stirring in 250 parts water.

(B) 0.5 parts caustic soda are dissolved in 25 parts water.

(C) A mixture is made of 1000 parts melted asphalt, 275 parts kerosene, 10 parts cresylic acid.

A and B are mixed together. C is brought to approximately 212° F. and added with stirring to the mixture of A and B.

In the preparation of C above, the use of kerosene and cresylic acid will be noted. The kerosene is used to reduce the melting point of the asphalt so that it does not exceed 212° F. If asphalt with a melting point much above the boiling point of water, is added to water, the asphalt tends to chill before it is emulsified. Kerosene is a convenient liquid to reduce the melting point, and any other oil or similar substance, of low melting point, and miscible with asphalt, may be used instead of kerosene. The cresylic acid is used as a preservative, to prevent fermentation of the emulsion on standing. Any suitable preservative may be used in its stead. The preservative is not an essential part of the emulsion.

(2) (A) 100 parts linseed flour are stirred into 250 parts water.

(B) 5 parts caustic soda are dissolved in 25 parts water.

(C) A mixture is made of 1000 parts asphalt and 275 parts kerosene and brought to 212° F. A, B and C are mixed as in Example 1.

(3) (A) 2.5 parts caustic soda are dissolved in 437.5 parts water. 50 parts peanut flour are added to this solution.

(B) 500 parts asphalt and 137 parts kerosene are mixed at 212° F. B is added to A with stirring.

(4) (A) 2.5 parts caustic soda are dissolved in 437.5 parts water. 50 parts cottonseed flour are added to this solution.

(B) 500 parts asphalt and 137 parts kerosene are mixed at 212° F. B is added to A with stirring.

(5) (A) 2.5 parts caustic soda are dissolved in 437.5 parts water. To this solution is added 50 parts soya bean flour.

(B) 500 parts asphalt and 10 parts cresylic acid are brought to 212° F.

B is then added to A with stirring.

The asphalt emulsions described may be readily diluted with either cold or hot water. As made in the examples given they are viscous pasty masses. When thinned by dilution with water, they may be applied as a paint as asphalt paints are generally used. The dried films are highly water resistant, resembling asphalt paints or varnishes in this respect.

Or the asphalt emulsion may be added to paper pulp in a beater. Upon the addition of a precipitant, for example alum or sulphuric acid, the emulsion is broken and the asphalt is deposited on the fibres of the paper making a very water resistant paper.

(6) (A) 50 parts soya bean flour are mixed with 175 parts water.

(B) 5 parts caustic soda are disssolved in 25 parts water. A and B are mixed with stirring and to the mixture is added 500 parts of lubricating oil with stirring.

A stiff emulsion results, resembling a grease.

(7) 50 parts soya bean flour are mixed with 125 parts water. To the mixture 25 parts of a 20% caustic soda solution in water are added. To this mixture is added 500 parts melted paraffin wax (at about 120° F.) and 10 parts cresylic acid.

This makes a very stiff emulsion when cool. It may be diluted with warm water. The diluted emulsion is added to paper pulp in a beater, together with a precipitant as alum or sulphuric acid, whereupon the emulsion is broken and the paraffin wax is adsorbed by the fibre. The result is a paper which is a water proof paper similar to so-called paraffin paper, with the exception that the paraffin coats each particle of fibre instead of being a surface coat as in the ordinary paraffined paper.

(8) (A) 10 parts soya bean flour are stirred into 125 parts water.

(B) 1 part caustic soda is dissolved in 25 parts of water. B is added to A with stirring.

To the mixture of B and A is added 450 parts kerosene.

This gives an emulsion of salve-like consistency, easily diluted with water. It may be used wherever kerosene emulsions are desired, for example, in spraying foliage to control pests.

(9) (A) 5 parts soya bean flour are stirred with 125 parts water and 4 parts 28% ammonium hydroxide solution are added.

To A are added with stirring 1000 parts of a white paraffin viscous oil, and .005 parts beta naphthol as preservative.

This makes an emulsion of salve-like consistency, easily diluted with water. It is valuable for spraying foliage and fruit.

(10) (A) 1 part rosin is mixed with 4 parts soya bean flour, dry. The dry mixture is stirred with 125 parts water, and 4 parts ammonium hydroxide 28% solution are added.

To A is added 1000 parts of a white viscous paraffin oil and 0.005 parts beta naphthol as preservative.

Rosin mixed with the protein containing material has a beneficial effect in many emulsions. We believe that rosin aids in the original dispersion of the protein containing material, thus enabling it to function better as an emulsifying agent.

(11) (A) 2.5 parts soya bean flour are mixed dry with 2.5 parts rosin. The dry mixture is stirred into 125 parts water, and 4 parts ammonium hydroxide 28% solution added.

To A is added 600 parts gasoline with .005 parts beta naphthol as preservative.

This gives an emulsion of salve-like consistency. It may be used for cleansing purposes. It is readily diluted with water.

(12) (A) 100 parts soya bean flour, 100 parts herring oil soap, 400 parts water are mixed and heated to 180° F. To 25 parts of this mixture A are added 70 parts lubricating oil, making a jelly-like emulsion, used as a grease.

1.5 parts of the wet mixture A in Example 12, are added to 100 parts standard Bordeaux mixture. The ability of the Bordeaux mixture to remain suspended in water is thereby greatly increased.

(13) (A) 100 parts soya bean flour, 25 parts rosin, 15 parts caustic soda, 400 parts water are mixed and heated with stirring to 212° F. 25 parts of mixture A are mixed with stirring with 70 parts lubricating oil to give a jelly-like grease.

1.5 parts of mixture A of Example 13 when added to 100 parts Bordeaux mixture, increase its suspending power.

(14) (A) 98.5 parts hydrated lime, 1.5 parts soya bean flour 1000 parts water are mixed.

(B) 100 parts copper sulphate crystals (blue stone) are dissolved in 21000 parts water.

A is added to B with stirring. This gives a Bordeaux mixture which remains in suspension for a much longer time than Bordeaux mixture made in the usual manner.

(15) (A) 1 part soya bean flour, 0.5 parts rosin are dry mixed.

A is mixed with 98.5 parts hydrated lime, and the whole stirred into 1000 parts water.

(B) 100 parts blue stone are dissolved in 21000 parts water.

A is added to B with stirring.

This gives a Bordeaux mixture of very superior suspending ability.

(16) (A) A dry mix is made of 100 parts soya bean flour and 10 parts rosin. This is added to 850 parts water and 40 parts ammonium hydroxide solution (28%).

(B) To 25 parts of A are added 250 parts ortho di-chlor-benzene.

(C) 5 parts of a mixture of 5 parts beta naphthol and 50 parts alcohol, are added as preservative.

This gives an emulsion of salve-like consistency valuable for spraying. In this emulsion, water is the dispersed phase.

We find that the use of carbon bisulphide, thiocarbonates and similar carbon sulphur compounds in conjunction with vegetable protein containing materials as enumerated above, has a beneficial effect in making emulsions more permanent.

The following examples will illustrate this method:

(17) (A) 250 parts water and 50 parts soya bean flour are mixed together.

(B) 5 parts caustic soda are dissolved in 25 parts water.

B is stirred into A.

(C) A mixture is made of 1000 parts asphalt, and 10 parts cresylic acid. This is brought to 212° F. and added to A and B with stirring.

(D) 375 parts water, 30 parts hydrated lime and 13 parts carbon bisulphide are stirred together. D is added to the mixture of A B and C.

(18) 10 parts soya bean flour are stirred into 125 parts water. To this is added 1 part sodium thio carbonate in solution in 25 parts water. To this is added 450 parts kerosene with .005 parts beta naphthol as preservative.

(19) 5 parts soya bean flour are stirred into 125 parts water. To this is added 1 part caustic soda in 15 parts water. To this is added 10 parts thio carbanalide in 20 parts alcohol. To this is added 1000 parts of a viscous paraffin oil.

(20) In 22 sodium or potassium xanthate are substituted for sodium thio carbonate.

(21) A dry mix is made of 10 parts rosin and 100 parts soya bean flour. This is stirred into 400 parts water and 40 parts ammonium hydroxide 28% solution. 10 parts carbon bisulphide are added. To this is added with stirring 1000 parts of a viscous paraffin oil and 100 parts water.

(22) 100 parts soya bean flour are stirred into 400 parts water and 40 parts ammonium hydroxide solution (28%). To this is added 10 parts carbon bisulphide. To this is added 1000 parts of a viscous paraffin oil and 100 parts water.

20 parts soya bean flour are stirred into 100 parts water containing 1 part caustic soda. 2 parts carbon bisulphide are added. To this mixture is added 130 parts kaolin mixed with 90 parts water.

This emulsion (or suspension) is very slow settling. It may be used as a coating for paper.

Variations of the above examples of emulsions may be made using linseed, peanut or cottonseed flours in proportions equivalent to the amounts of soya bean flour used in the illustrative examples.

We claim:

1. As an emulsifying agent, oleaginous seed flour dispersed in alkaline aqueous media together with carbon bisulphide.

2. As an emulsifying agent, soya bean flour dispersed in alkaline aqueous media together with carbon bisulphide.

3. An emulsifying agent embodying oleaginous seed flour dispersed in an alkaline aqueous medium, together with sulphur derivative of carbonic acid.

4. An emulsifying agent embodying soya bean flour dispersed in an alkaline aqueous medium, together with sulphur derivative of carbonic acid.

5. An emulsion comprising dispersed oleaginous seed flour, water, an oily substance and a sulphur derivative of carbonic acid.

6. An emulsion comprising dispersed soya bean flour, water, an oily substance and a sulphur derivative of carbonic acid.

7. An emulsion comprising dispersed oleaginous seed flour, water, an oily substance, rosin, and a sulphur derivative of carbonic acid.

8. An emulsion comprising dispersed oleaginous seed flour, water, paraffin, and a sulphur derivative of carbonic acid.

9. An emulsion comprising dispersed oleaginous seed flour, water, asphalt, and a sulphur derivative of carbonic acid.

10. An emulsion comprising dispersed soya bean flour, water, an oily substance, rosin, and a sulphur derivative of carbonic acid.

11. An emulsion comprising dispersed soya bean flour, water, paraffin, and a sulphur derivative of carbonic acid.

12. An emulsion comprising dispersed soya bean flour, water, asphalt, and a sulphur derivative of carbonic acid.

In witness whereof we hereunto subscribe our names this 9th day of February, A. D. 1927.

HARRY P. BANKS.
GLENN DAVIDSON.
IRVING F. LAUCKS.
HUGH F. RIPPEY.